US010336225B2

(12) United States Patent
Kumagai et al.

(10) Patent No.: US 10,336,225 B2
(45) Date of Patent: Jul. 2, 2019

(54) VEHICLE SEAT

(71) Applicant: TACHI-S CO., LTD., Tokyo (JP)

(72) Inventors: Kotaro Kumagai, Tokyo (JP);
Masayuki Taguchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/562,301

(22) PCT Filed: Feb. 15, 2016

(86) PCT No.: PCT/JP2016/054330
§ 371 (c)(1),
(2) Date: Sep. 27, 2017

(87) PCT Pub. No.: WO2016/158042
PCT Pub. Date: Oct. 6, 2016

(65) Prior Publication Data
US 2018/0345832 A1 Dec. 6, 2018

(30) Foreign Application Priority Data
Mar. 31, 2015 (JP) ................................. 2015-073237

(51) Int. Cl.
B60N 2/56 (2006.01)
A47C 31/02 (2006.01)
(Continued)

(52) U.S. Cl.
CPC .............. B60N 2/5657 (2013.01); A47C 7/74
(2013.01); A47C 31/02 (2013.01); B60N 2/56
(2013.01); B60N 2/58 (2013.01); B60N
2/5816 (2013.01)

(58) Field of Classification Search
CPC .. B60N 2/5657; B60N 2/5816; B60N 2/5825;
B60N 2/5833; B60N 2/5841; B60N
2/5858; B60N 2/5883
(Continued)

(56) References Cited
U.S. PATENT DOCUMENTS 6,299,255 B1 * 10/2001 Pichon ................. B60N 2/5825
297/218.5
9,789,796 B1 * 10/2017 White .................... B60N 2/565
(Continued)

FOREIGN PATENT DOCUMENTS

DE 10156658 C1 5/2003
JP 2000-125990 A 5/2000
(Continued)

OTHER PUBLICATIONS

International Search Report for PCT/JP2016/054330 dated Apr. 26, 2016; English translation submitted herewith (5 pages).

Primary Examiner — Mark R Wendell
(74) Attorney, Agent, or Firm — Fitch, Even, Tabin & Flannery, LLP

(57) ABSTRACT

A vehicle seat includes a seat cushion and a seatback. The seat cushion includes a pad having a groove, a plurality of seat covers for covering the pad surface, and a suspending member for connecting two of the plurality of seat covers, and fixing the two seat covers to the pad inside the groove formed in the pad. A plurality of minute holes are formed in the suspending member between a part connected to one of the two seat covers and a part connected to the other seat cover for ventilation between an inside and an outside of the groove formed in the pad with respect to the suspending member. This secures ventilation performance of the seat cover surface even when the occupant is seated on the vehicle seat.

14 Claims, 6 Drawing Sheets

(51) Int. Cl.
*A47C 7/74* (2006.01)
*B60N 2/58* (2006.01)

(58) Field of Classification Search
USPC .................................................. 297/452.46
See application file for complete search history.

(56) References Cited

U.S. PATENT DOCUMENTS

| | | | | |
|---|---|---|---|---|
| 2002/0101109 | A1* | 8/2002 | Stiller | B60N 2/5825 297/452.6 |
| 2003/0186642 | A1* | 10/2003 | Aoki | B60N 2/5635 454/120 |
| 2006/0038432 | A1 | 2/2006 | Koehler | |
| 2006/0060344 | A1* | 3/2006 | Esaki | B60H 1/00285 165/287 |
| 2009/0079236 | A1 | 3/2009 | Itou et al. | |
| 2013/0247338 | A1* | 9/2013 | Santin | F16B 2/22 24/545 |
| 2014/0352117 | A1* | 12/2014 | Murasaki | A47C 31/023 24/581.11 |
| 2015/0130255 | A1* | 5/2015 | Kheil | B60N 2/5825 297/452.58 |

FOREIGN PATENT DOCUMENTS

| | | |
|---|---|---|
| JP | 2006-051351 A | 2/2006 |
| JP | 2006-082589 A | 3/2006 |
| JP | 2006-102329 A | 4/2006 |
| JP | 2009-077760 A | 4/2009 |
| JP | 2013-184625 A | 9/2013 |
| JP | 2013-233900 A | 11/2013 |

* cited by examiner

VEHICLE SEAT

CROSS-REFERENCE TO RELATED APPLICATIONS

This application is a U.S. national phase application filed under 35 U.S.C. § 371 of International Application No. PCT/JP2016/054330, filed Feb. 15, 2016, designating the United States, which claims priority from Japanese Patent Application No. 2015-073237, filed Mar. 31, 2015, which are hereby incorporated herein by reference in their entirety.

TECHNICAL FIELD

The present invention relates to a vehicle seat.

BACKGROUND ART

The vehicle seat is formed by covering the surface of the polyurethane seat pad with the seat cover. Patent Literatures 1 to 3 disclose that a large number of minute holes are formed in a seat cover surface (skin surface) for preventing stuffiness of the seat on which the occupant is seated by improving ventilation performance.

CITATION LIST

Patent Literature

Patent Literature 1: Japanese Patent Application Laid-Open No. 2000-125990
Patent Literature 2: Japanese Patent Application Laid-Open No. 2006-102329
Patent Literature 3: Japanese Patent Application Laid-Open No. 2013-233900

SUMMARY OF INVENTION

Technical Problem

The vehicle seat of some type has a large number of minute holes formed in the seat cover surface (skin surface) for improving ventilation performance of the seat cover. The blower is disposed below the seat or at backside of the seat for blowing off air from the minute holes in the skin surface (skin) via the groove or the hole formed in the seat pad so as to further improve the ventilation performance of the seat cover.

As the occupant sits on the seat, the minute holes formed in the seat cover surface, especially those in the part in contact with the occupant will be covered, failing to secure ventilation performance.

Referring to FIG. 8 as a sectional view showing the state that the occupant is seated on the seat cushion of the generally employed vehicle seat, a code 701 denotes an urethane pad, 702 denotes a seat cover for covering the surface of the pad 701, 703 denotes a groove formed in the pad 701, 710 denotes a suspending member for connecting left and right seat covers, 711 denotes a core wire embedded in the pad 701, 712 denotes a hook ring for connecting the suspending member 710 and the core wire 711, and 713 denotes a large number of minute holes formed for keeping the surface of the seat cover 702 in the ventilated state. In the drawing, a code 730 denotes buttocks of an occupant seated on the seat cushion.

As FIG. 8 shows, the large number of minute holes formed in the seat cover 702 will be covered with the buttocks 730 of the occupant seated on the seat cushion. As a result, air cannot be blown from the minute holes formed in the occupant-seated surface, making the covered region stuffy.

It is an object of the present invention to solve the problems of the generally employed vehicle seat so as to provide a vehicle seat which secures ventilation performance of the seat cover surface even when the occupant is seated on the seat.

Solution to Problem

In order to solve the problem, the present invention provides a vehicle seat having a seat cushion and a seatback. The seat cushion includes a pad having a groove, a plurality of seat covers for covering the pad surface, and a suspending member for connecting two of the plurality of seat covers to fix the two seat covers to the pad inside the groove formed in the pad. A plurality of minute holes are formed in the suspending member between a part connected to one of the two seat covers and a part connected to the other seat cover for ventilation between an inside and an outside of the groove formed in the pad with respect to the suspending member.

In order to solve the problem, the present invention provides a vehicle seat having a seat cushion and a seatback. The seat cushion including a pad having a groove, a plurality of seat covers for covering the pad surface, and a suspending member for connecting two of the plurality of seat covers, and fixing the two seat covers to the pad inside the groove formed in the pad. A plurality of minute holes are formed around a part connected to the suspending member for connecting the two seat covers inside the groove formed in the pad for ventilation between an inside and an outside of the groove formed in the pad with respect to the two seat covers.

In order to solve the problem, the present invention provides a vehicle seat having a seat cushion and a seatback. The seat cushion includes a pad having a groove, a plurality of seat covers for covering the pad surface, and a suspending member for connecting two of the plurality of seat covers, and fixing the two seat covers to the pad inside the groove formed in the pad. A plurality of minute holes are formed at positions of the two seat covers or the suspending member inside the groove for securing ventilation between an inside of the groove, and surfaces of the seat covers at an outside of the groove.

Advantageous Effects of Invention

The present invention secures ventilation performance of the seat surface even when the occupant is seated thereon. This makes it possible to improve feeling of the occupant seated on the seat.

DESCRIPTION OF EMBODIMENT

Figure 1:
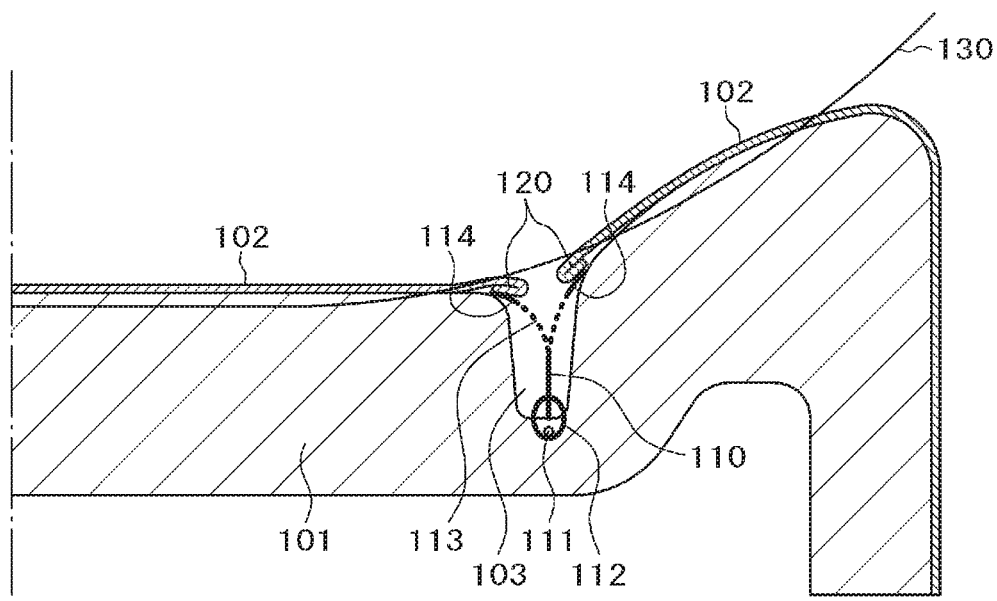
FIG. 1 is a sectional view of a seat cushion of a vehicle seat according to a first example of the present invention.

The vehicle seat according to the present invention includes a seat cushion and a seat back. A groove is formed in the pad which stores the suspending member for connecting the seat covers that cover the respective pad surfaces, and fixing the connected covers in the pad. A plurality of minute holes are formed at a position of the suspending member or in the groove of the pad of the seat cover, which are not covered with the seated occupant. The plurality of minute holes secure the ventilation performance between the inside of the groove and the surface of the seat cover outside the groove for improving feeling of the seated occupant.

Examples according to the present invention will be described referring to the drawings.

First Example

Figure 4:
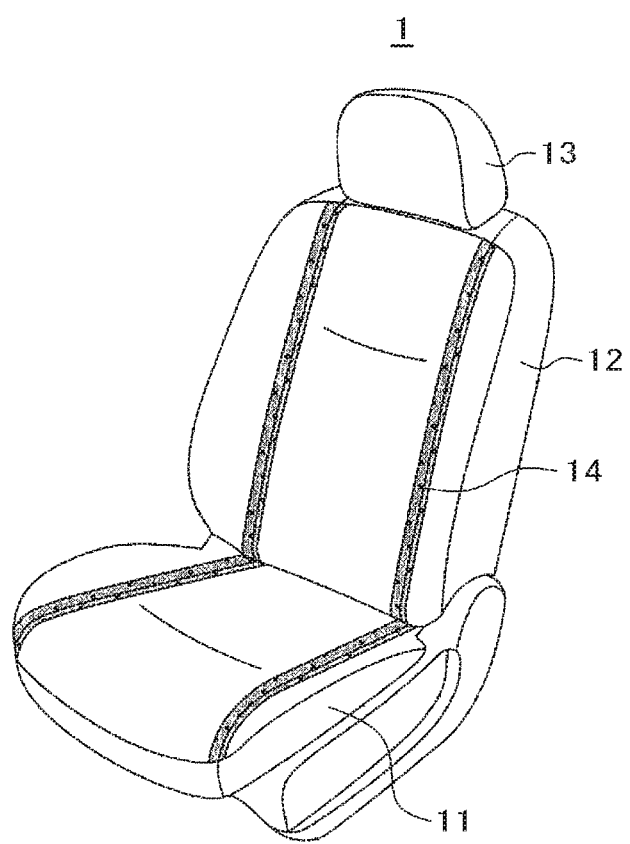
FIG. 4 is a perspective view of the vehicle seat according to the first example of the present invention, showing an example that the suspending member is disposed along the length of the seat.
Figure 5:
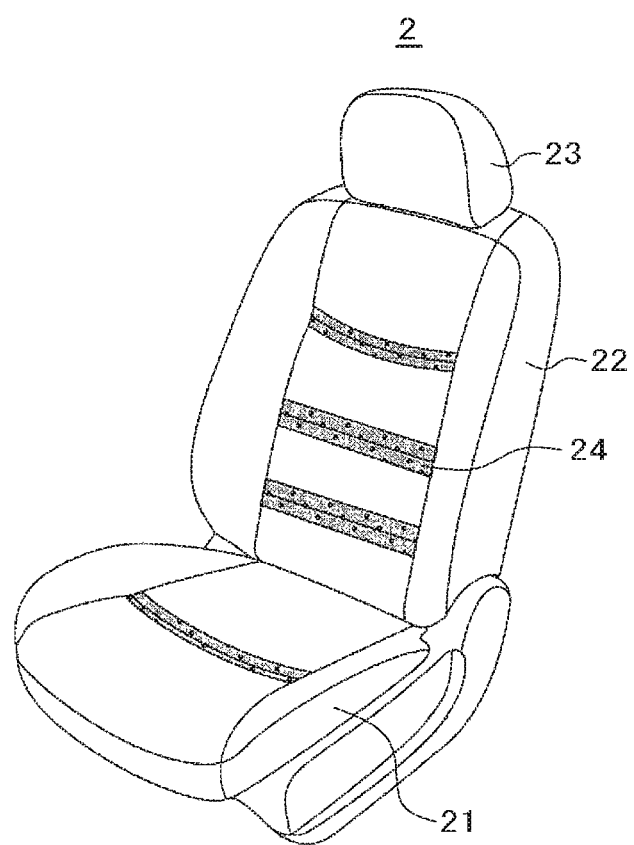
FIG. 5 is a perspective view of the vehicle seat according to the first example of the present invention, showing an example that the suspending member is disposed along the width of the seat.

As FIG. 4 or 5 shows, a vehicle seat 1 or 2 according to the example includes a seat cushion 11 or 21, a seatback 12 or 22, and a head rest 13 or 23, respectively. In this example, the explanation will be made with respect to application of the present invention to the seat cushion 21 of the vehicle seat 2 as shown in FIG. 5.

FIG. 1 shows a section of the seat cushion 21 according to the example. The seat cushion 21 of the vehicle seat 2 of the example is formed in the process steps as described below. The surface of a urethane pad 101 is covered with left and right seat covers 102. Then those covers 102 are fixed with a Y-like suspending member 110 inside a groove 103 formed in the urethane pad 101. A lower part of the suspending member is connected to a core wire 111 embedded in the urethane pad 101 with a hook ring 112.

Figure 8:
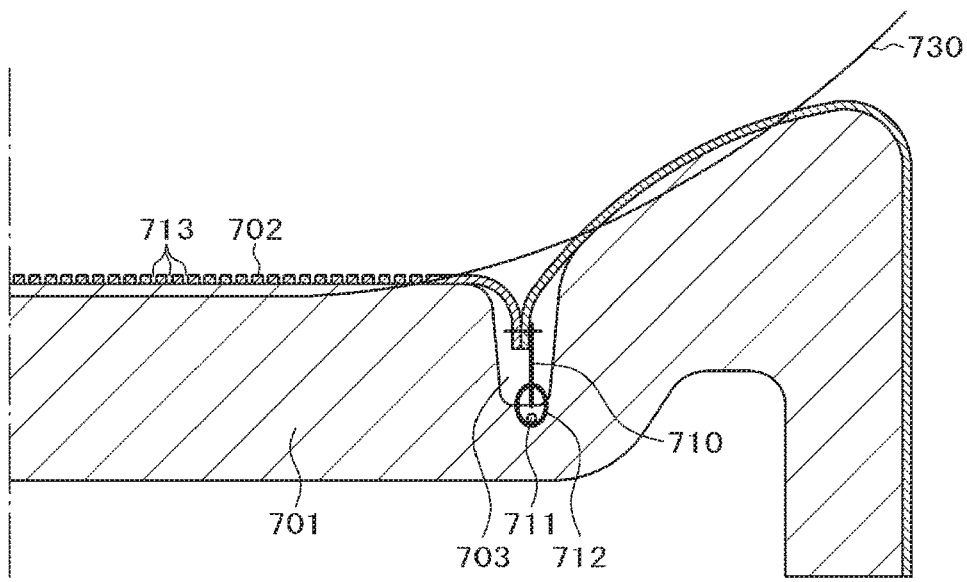
FIG. 8 is a sectional view of a seat cushion of the conventional vehicle seat.

Instead of the conventional suspending member 710 for connecting the left and right seat covers 702 which are overlaid with each other as shown in FIG. 8, this example employs the Y-like suspending member 110 sewn to the respective folded end parts 120 and 114 of the left and right seat covers for connection. In this example, the Y-like suspending member 110 is partially exposed to the seat cushion surface. The large number of minute holes 113 for ventilation are formed in the exposed seat cushion surface.

Figure 2:
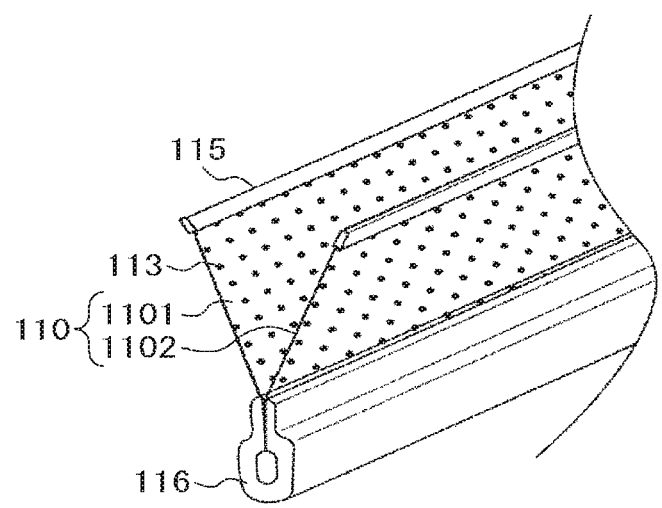
FIG. 2 is a perspective view of a suspending member of the vehicle seat according to the first example of the present invention.

FIG. 2 shows structure of the Y-like suspending member 110. The Y-like suspending member 110 is constituted by a pair of left and right cloths 1101, 1102 in which minute ventilation holes 113 are formed. One edge of the cloth 1101, and one edge of the cloth 1102 are reinforced with reinforcing members 115. The other edge of the cloth 1101, and the other edge of the cloth 1102 are overlaid with each other and pinched with a reinforcing member 116 for reinforcing purpose. The pair of left and right cloths 1101 and 1102 are made of fabric, leather, synthetic leather, or resin.

The regions around edges of the cloths 1101 and 1102, which are reinforced with the reinforcing members 115, respectively are sewn and connected to the corresponding seat covers 102.

Figure 3:
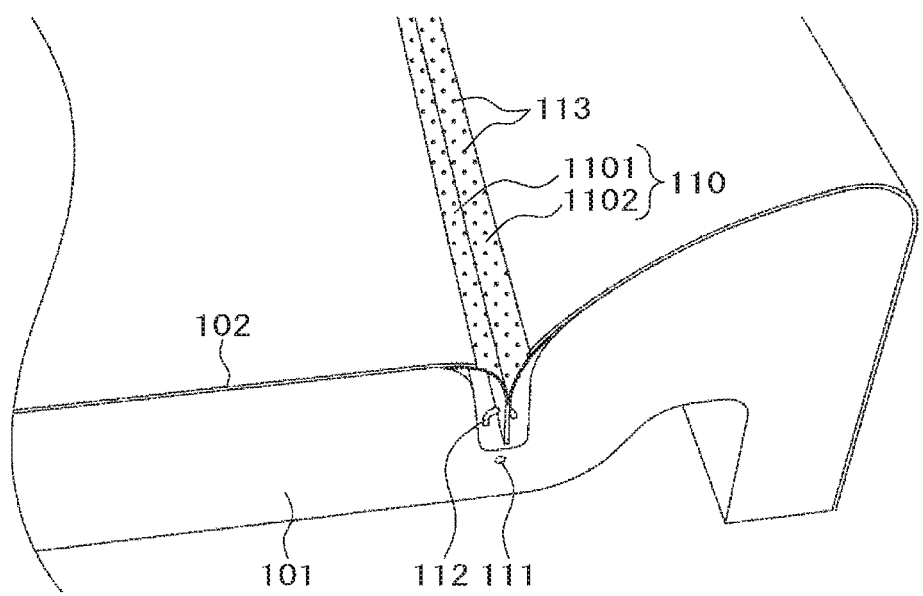
FIG. 3 is a perspective view of the seat cushion of the vehicle seat according to the first example of the present invention.

FIG. 3 shows connection of the Y-like suspending member 110 which is sewn to the seat covers 102, and fitted with the pad 101 to the core wire 111 embedded in the pad 101 with the hook ring 112. The pair of left and right cloths 1101 and 1102 of the Y-like suspending member 110 sewn to the seat covers 102 inside the groove 103 formed in the pad 101 are partially exposed to the surface thereof. The large number of minute holes 113 formed in the pair of left and right cloths 1101 and 1102 secure ventilation between each upper side (the side surface on which the occupant is seated) and each lower side (facing the wall surface of the groove 103) of the cloths 1101 and 1102 inside the groove 103.

As the large number of minute ventilation holes 113 are formed in the Y-like suspending member 110 inside the groove 103 formed in the pad 101, those minute ventilation holes 113 are not covered with the buttocks 130 of the occupant seated on the seat cushion 21. This makes it possible to secure the ventilated state of the seat cushion 21 when the occupant is seated.

In the example described referring to FIGS. 1 to 3, the pair of left and right cloths 1101 and 1102 of the Y-like suspending member 110 sewn to the seat covers 102 are exposed to the surface of the seat cushion 21. However, the example is not limited to the one as described above. It is possible to make each length of the pair of left and right cloths 1101 and 1102 of the Y-like suspending member 110 different so that any one of the cloths is only exposed to the surface of the seat cushion 21. In such a case, a large number of minute holes may be formed in any one of the cloths 1101 and 1102, which is exposed to the surface of the seat cushion 21.

FIG. 4 illustrates the vehicle seat 1 including the seat cushion 11, the seatback 12, and the head rest 13. The vehicle seat 1 as shown in FIG. 1 is configured by applying the Y-like suspending member 110 as described in the example referring to FIGS. 1 to 3 to the seat cushion 11 and the seatback 12 of the vehicle seat 1 in the form of lines 14 along the seat length or in the longitudinal direction of the seat.

The Y-like suspending member 110 is applied to the seat cushion 11 and the seatback 12 as the lines 14 along the seat length, or along a body of the seated occupant. This secures the ventilated states in the region of the seatback and the seat cushion corresponding to both sides of the occupant's back, who is seated on the vehicle seat 1, and corresponding to the part of the seated occupant from the buttocks to thighs. This makes it possible to improve the feeling of the occupant seated on the vehicle seat 1.

FIG. 5 illustrates the vehicle seat 2 including the seat cushion 21, the seatback 22, and the head rest 23. The vehicle seat 2 as shown in FIG. 5 is configured by applying the Y-like suspending member 110 as described in the example referring to FIGS. 1 to 3 to the seat cushion 21 and the seatback 22 of the vehicle seat 2 in the form of lines 24 along the seat width.

The Y-like suspending member 110 is applied to the seat cushion 21 and the seatback 22 as the lines 24 along the seat width, or in the lateral direction of the seated occupant's body. This secures the ventilated state in the region of the seatback and the seat cushion corresponding to the body part of the occupant seated on the vehicle seat 1 from the back to buttocks. This makes it possible to improve the feeling of the occupant seated on the vehicle seat 1.

By combining the Y-like suspending members 110 applied to the seat cushion 11 and the seatback 12 of the vehicle seat 1 as the lines 14 along the seat length or in the longitudinal direction as shown in FIG. 4 with the Y-like suspending members 110 applied to the seat cushion 21 and the seat-back 22 of the vehicle seat 2 as the lines 24 along the seat width as shown in FIG. 5, the longitudinal lines 14 and the lateral lines 24 may be formed on the seat cushion 11(21) and the seatback 12 (22) of the vehicle seat 1(2).

In this example, the explanation has been made with respect to the large number of minute ventilation holes 113 formed in the Y-like suspending member 110 as an example. Likewise the conventional structure, the large number of minute ventilation holes 113 may be formed in the seat covers 102 besides the Y-like suspending member 110.

Second Example

Figure 6:
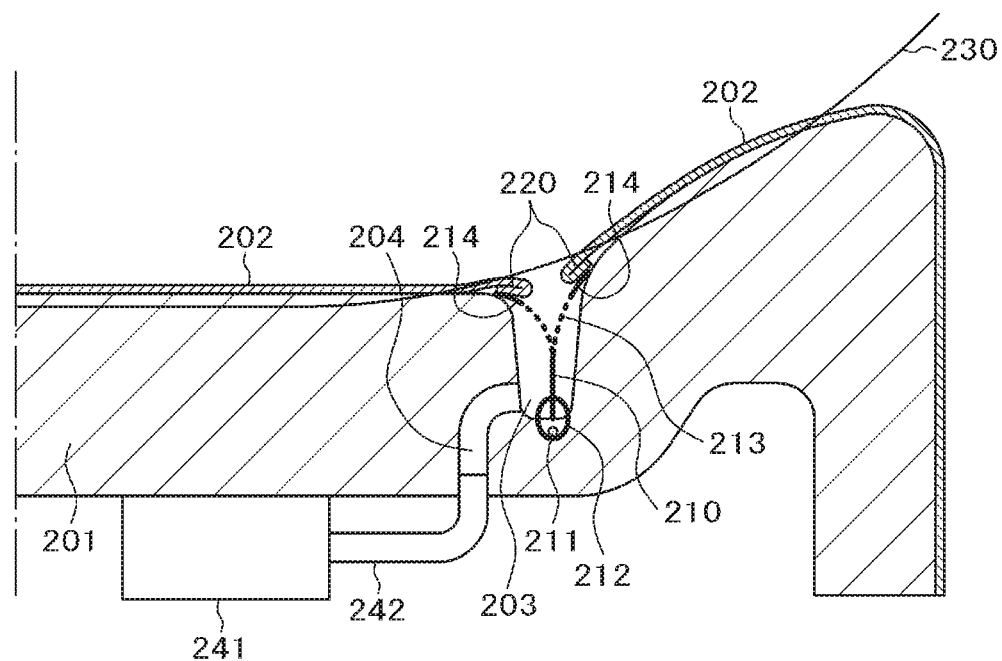
FIG. 6 is a sectional view of a seat cushion of the vehicle seat according to a second example of the present invention.

Referring to FIG. 6, an explanation will be made with respect to a structure formed by adding a blower 241 to the structure as described in the first example referring to FIGS. 1 to 3.

Likewise the structure according to the first example as shown in FIGS. 1 to 3, the seat cushion of the vehicle seat 2 of the example is formed in the process steps as described below. The surface of an urethane pad 201 is covered with left and right seat covers 202. Then those covers 202 are fixed with a Y-like suspending member 210 inside a groove 203 formed in the urethane pad 201. A lower part of the suspending member is connected to a core wire 211 embedded in the urethane pad 201 with a hook ring 212.

Referring to FIG. 6, the blower 241 and a duct 242 are disposed below the pad 201. The air fed from the blower 241 is supplied to an air feeding hole 204 formed in the pad 201 via the duct 242. The air is further fed from the air feeding hole 204 to the inside of the groove 203 formed in the pad 201, and then discharged from a large number of minute holes 213 formed in the Y-like suspending member 210 inside the groove 203 to the region around buttocks 230 of the occupant seated on the seat cushion.

As described in the first example, the large number of minute ventilation holes 213 are formed in the Y-like suspending member 210 inside the groove 203 formed in the pad 201. This may prevent the minute ventilation holes 213 from being covered with the buttocks 230 of the occupant seated on the seat cushion. Then the air fed from the blower 241 may be securely supplied to the occupant seated on the seat cushion so as to ensure the ventilated state of the seat cushion on which the occupant is seated. As a result, the feeling of the occupant seated on the vehicle seat may be improved.

The explanation has been made in this example with respect to the large amount of minute ventilation holes 213 formed in the Y-like suspending member 210. However, it is also possible to form the large number of minute ventilation holes 213 in the seat covers 202 besides the Y-like suspending member 210.

Likewise the first example, the Y-like suspending members 210 as described in this example may be disposed as indicated by FIG. 4 or 5. It is also possible to combine those members in the longitudinal and lateral directions in combination of FIG. 4 with FIG. 5.

It is also possible to dispose the blower to the side of the seatback 12 or 22 (not shown).

Third Example

Explanations have been made in the first and the second examples with respect to the structure having the left and right (upper and lower) seat covers 102 (202) fixed with the Y-like suspending member 110 (210) inside the groove 103 (203) formed in the pad 101 (201). This example will describe the use of the suspending member with the same shape as that of the conventional suspending member 710 as described referring to FIG. 8.

The structure which employs the suspending member of this example will be described referring to FIG. 7.

Figure 7:
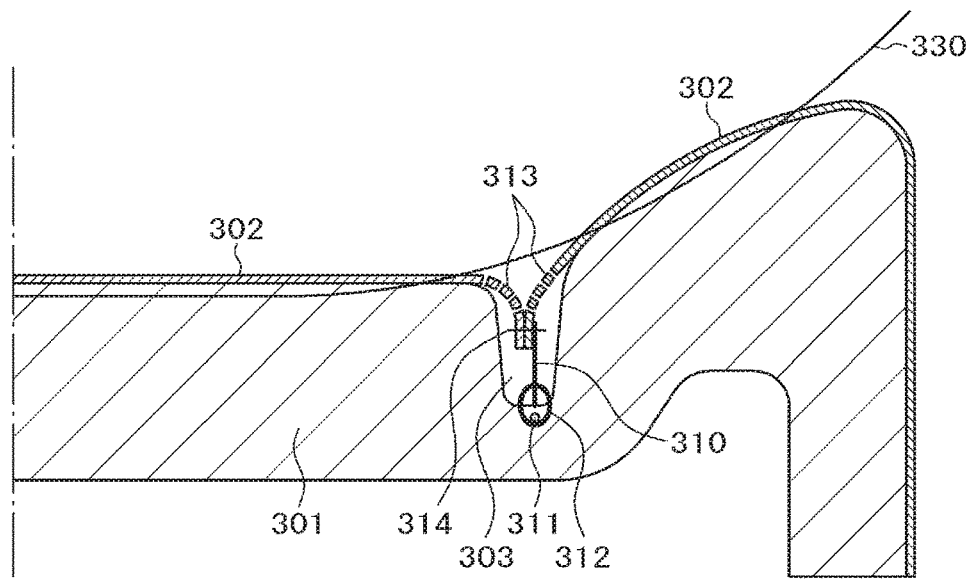
FIG. 7 is a sectional view of a seat cushion of the vehicle seat according to a third example of the present invention.

As FIG. 7 shows, the surface of an urethane pad 301 is covered with seat covers 302. The left and right seat covers 302 have the respective end portions overlaid inside a groove 303 formed in the urethane pad 301 so as to be fixed with a suspending member 310. The lower end portion of the suspending member is connected to a core wire 311 embedded in the urethane pad 301 with a hook ring 312.

The structure of this example has a large amount of minute holes 313 formed in parts of the left and right seat covers 302 inside the groove 303.

The above-described structure allows air flow between each upper surface (on which the occupant is seated) and lower surface (facing the pad 301) of the left and right seat covers 302 inside the groove 303. This secures the ventilated state of the upper surfaces and the lower surfaces of the left and right seat covers 302.

The large number of minute ventilation holes 313 are formed in the seat covers 302 which are positioned inside the groove 303 formed in the pad 301 so as to prevent, those minute ventilation holes 312 from being covered with the buttocks 330 of the occupant seated on the seat cushion. This secures the ventilated state of the seat cushion on which the occupant is seated.

Likewise the second example, the blower (not shown) and the duct (not shown) may be disposed below the seat cushion for feeding air from the blower to the inside of the groove 303 formed in the pad 301 via the duct. This secures air feeding to the occupant seated on the seat cushion through the minute ventilation holes formed in the seat covers 302.

Likewise the first example, it is possible to arrange the seat covers 302 having the minute ventilation holes 313 as shown in FIG. 4 or 5, or combine those covers in the longitudinal and lateral directions in combination of FIG. 4 with FIG. 5.

This example secures the ventilated state of the seat cushion on which the occupant is seated without changing configuration of components of the conventional structure.

REFERENCE SIGNS LIST 1, 2: vehicle seat,
11, 21: seat cushion,
12, 22: seatback,
101, 201, 301: pad,
102, 202, 302: seat cover,
103, 203, 303: groove,
110, 210: like suspending member,
113, 213, 313: minute hole,
141, 241: blower,
142, 242: duct

The invention claimed is:
1. A vehicle seat, comprising:
a seat cushion, and
a seatback,
wherein the seat cushion includes:
    a pad having a groove,
    a plurality of seat covers for covering the pad surface, and a suspending member for connecting two of the plurality of seat covers, and fixing the two seat covers to the pad inside the groove formed in the pad, wherein a plurality of minute holes are formed in the suspending member which is partially exposed to a surface of the pad between a part connected to one of the two seat covers, and a part connected to the other seat cover, the plurality of minute holes extending through the suspending member from an inside to an outside of the groove formed in the pad with respect to the suspending member for ventilation between an inside and an outside of the groove formed in the pad with respect to the suspending member.

2. The vehicle seat according to claim 1, wherein the seatback includes a seatback pad having a groove, a plurality of seatback seat covers for covering the seatback pad surface, and a seatback suspending member for connecting two of the plurality of seatback seat covers, and fixing the two seatback seat covers to the seatback pad inside the groove formed in the seatback pad; and wherein a second plurality of minute holes are formed in the seatback suspending member which is partially exposed to a surface of the seatback pad between a part connected to one of the two seatback seat covers, and a part connected to the other seatback seat cover for ventilation between an inside and an outside of the groove formed in the seatback pad with respect to the seatback suspending member.

3. The vehicle seat according to claim 2, wherein the seatback seat cushion further includes a seatback blower, and a seatback duct for connecting the seatback blower to the seatback pad; and wherein the seatback blower blows off air into the groove formed in the seatback pad via the seatback duct for discharging air from the groove to the outside of the seatback seat cushion through the plurality of minute holes formed in the seatback suspending member.

4. The vehicle seat according to claim 2, wherein the second plurality of minute holes are formed in the seatback suspending member, which are positioned so as not to be covered with an occupant seated on the seatback seat cushion.

5. The vehicle seat according to claim 1, wherein the seat cushion further includes a blower, and a duct for connecting the blower to the pad; and wherein the blower blows off air into the groove formed in the pad via the duct for discharging air from the groove to the outside of the seat cushion through the plurality of minute holes formed in the suspending member.

6. The vehicle seat according to claim 1, wherein the plurality of minute holes are formed in the suspending member, which are positioned so as not to be covered with an occupant seated on the seat cushion.

7. A vehicle seat, comprising:

a seat cushion, and a seatback, wherein the seat cushion includes:

a pad having a groove, a plurality of seat covers for covering the pad surface, and a suspending member for connecting two of the plurality of seat covers, and fixing the two seat covers to the pad inside the groove formed in the pad, and wherein a plurality of minute holes are formed around a part connected to the suspending member which is partially exposed to a surface of the pad for connecting the two seat covers inside the groove formed in the pad, the plurality of minute holes extending through the part connected to the suspending member from an inside to an outside of the groove formed in the pad with respect to the two seat covers for ventilation between an inside and an outside of the groove formed in the pad with respect to the two seat covers.

8. The vehicle seat according to claim 7, wherein the seatback includes a seatback pad having a groove, a plurality of seatback seat covers for covering the seatback pad surface, and a seatback suspending member for connecting two of the plurality of seatback seat covers, and fixing the two seatback seat covers to the seatback pad inside the groove formed in the seatback pad; and wherein a second plurality of minute holes are formed around a part connected to the seatback suspending member for connecting the two seatback seat covers inside the groove formed in the seatback pad for ventilation between an inside and an outside of the groove formed in the seatback pad with respect to the two seatback seat covers.

9. The vehicle seat according to claim 8, wherein the second plurality of minute holes are formed in the seatback suspending member, which are positioned so as not to be covered with an occupant seated on the seatback seat cushion.

10. The vehicle seat according to claim 7, wherein the plurality of minute holes are formed around the part connected to the suspending member, which are positioned so as not to be covered with an occupant seated on the seat cushion.

11. A vehicle seat, comprising:

a seat cushion, and a seatback, wherein the seat cushion includes:

a pad having a groove, a plurality of seat covers for covering the pad surface, and a suspending member for connecting two of the plurality of seat covers, and fixing the two seat covers to the pad inside the groove formed in the pad, and wherein a plurality of minute holes are formed at positions of the two seat covers or the suspending member partially exposed to a surface of the pad inside the groove, the plurality of minute holes extending through the two seat covers or through the suspending member from an inside to an outside of the groove formed in the pad with respect to the two seat covers or the suspending member for securing ventilation between an inside of the groove, and surfaces of the seat covers at an outside of the groove.

12. The vehicle seat according to claim 11, wherein the seatback includes:

a seatback pad having a groove, a plurality of seatback seat covers for covering the seatback pad surface, and a seatback suspending member for connecting two of the plurality of seatback seat covers, and fixing the two seatback seat covers to the seatback pad inside the groove formed in the seatback pad; and wherein a second plurality of minute holes are formed at positions of the two seatback seat covers or the seatback suspending member inside the groove which is partially exposed to a surface of the seatback pad for securing ventilation between an inside of the groove, and surfaces of the seatback seat covers at an outside of the groove.

13. The vehicle seat according to claim 12,
wherein the second plurality of minute holes are formed at positions which are not covered with an occupant seated on the seatback seat cushion.

14. The vehicle seat according to claim 11, wherein the plurality of minute holes are formed at positions which are not covered with an occupant seated on the seat cushion.

* * * * *